Figure 1:
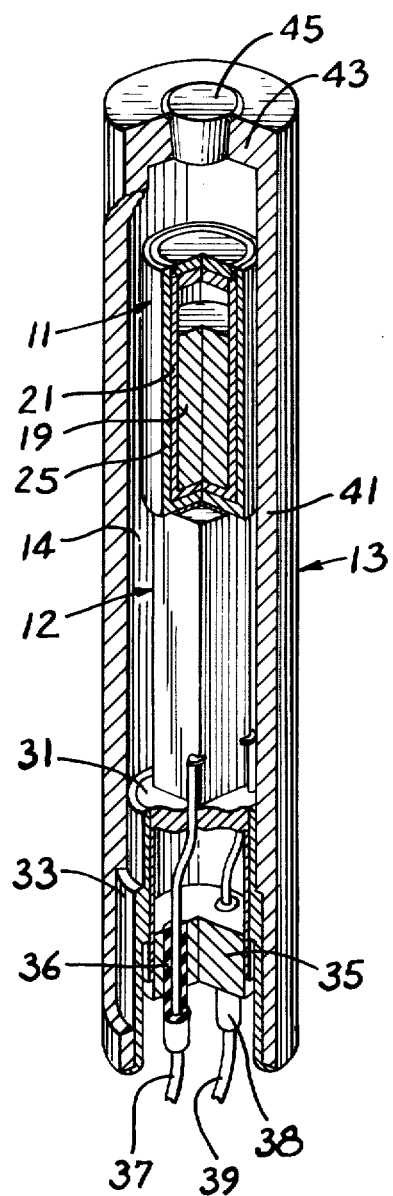

United States Patent
Carney

[11] 4,020,368
[45] Apr. 26, 1977

[54] ELECTRIC POWER GENERATOR
[75] Inventor: Homer Charles Carney, Del Mar, Calif.
[73] Assignee: General Atomic Company, San Diego, Calif.
[22] Filed: Jan. 23, 1975
[21] Appl. No.: 543,413
[52] U.S. Cl. .............................. 310/4 R; 136/202; 136/208; 136/210
[51] Int. Cl.² ........................................ H01V 1/30
[58] Field of Search ............... 310/4; 136/202, 208, 136/210

[56] References Cited
UNITED STATES PATENTS

| | | | |
|---|---|---|---|
| 3,322,979 | 5/1967 | Clendinning et al. | 310/9 |
| 3,347,711 | 10/1967 | Banks, Jr. et al. | 136/202 |
| 3,401,064 | 9/1968 | Perlow et al. | 136/202 |
| 3,534,202 | 10/1970 | Schutt | 310/4 |
| 3,615,869 | 10/1971 | Barker et al. | 136/202 |
| 3,663,306 | 5/1972 | Des Champs et al. | 136/202 |

FOREIGN PATENTS OR APPLICATIONS 1,303,834  1/1973  United Kingdom ............ 136/202

Primary Examiner—Donovan F. Duggan
Attorney, Agent, or Firm—Fitch, Even, Tabin & Luedeka

[57] ABSTRACT

An electric power generator of the type employing a nuclear heat source or the like and a thermoelectric converter is described wherein a transparent thermal insulating medium is provided inside an encapsulating enclosure to thermally insulate the heat source and thermoelectric generator. The heat source, the thermoelectric converter, and the enclosure are provided with facing surfaces which are heat-reflective to a substantial degree to inhibit radiation of heat through the medium of the encapsulating enclosure. Multiple reflective foils may be spaced within the medium as necessary to inhibit natural convection of heat and/or further inhibit radiation.

8 Claims, 2 Drawing Figures

U.S. Patent        April 26, 1977        4,020,368

ELECTRIC POWER GENERATOR

This invention relates generally to electric power generators and, more particularly, to electric power generators of the type which employ a heat source, a thermoelectric converter, and an ecapsulating enclosure containing a transparent thermal insulating medium.

Electric power generators of extremely small size are useful in a number of applications including power sources for medical implants. For example, cardiac pacing devices require an extremely long life and extremely small power source. Electric power generators for this purpose are known which employ a heat source, a thermoelectric converter, and an encapsulating enclosure. Usually, also, a heat sink is provided to establish a thermal gradient across the thermoelectric converter, which may be the enclosure of materials in contact with the enclosure.

To prevent loss of heat, the region around the heat source and the thermoelectric generator is typically insulated in such devices. The use of the inert gases xenon and krypton for this purpose is known to be effective when used alone or when used to fill fibrous type insulation. Xenon and krypton have a lower thermal conductivity than air and xenon has the lowest thermal conductivity of all inert gases. Xenon has a thermal conductivity of about 70% that of krypton and is therefore preferred for best insulation performance. Krypton is an excellent substitute in large insulation spaces where the high cost of xenon may be prohibitive. A gas medium inhibits increases in thermal conductivity by suppressing outgassing from the surfaces of the internal components of the generator over the operating lifetime of the device as compared with vacuum insulated enclosures. Consequently, chemical getters are not normally required to maintain sufficient gas purity for efficient insulation performance after many years of operation, whereas getters are required in vacuum systems. Although gas insulation in many devices would normally be inefficient because of heat transfer due to convection currents, small electric power generators of the type under consideration have insulation spaces so narrow as to limit the convective effects to a negligible value. Convective heat transfer is negligible for gases and temperatures of interest if the thickness of the insulating medium is less than about 0.15 in. Where the insulating gas, however, is essentially transparent to infrared radiation, such as is the case with xenon, heat transfer from the internal components to the encapsulating enclosure can occur as a result of thermal radiation. Radiation heat loss can be, in a typical prior art device, as high as 30% of the total heat loss, the remainder being by conduction through the insulating gas since convection is negligible.

It is an object of the present invention to provide an improved electric power generator.

Another object of the invention is to provide a gas filled radioisotopic battery of improved efficiency.

Another object of the invention is to provide a gas filled electric power generator in which thermal losses due to radiation are minimized.

Figure 2:
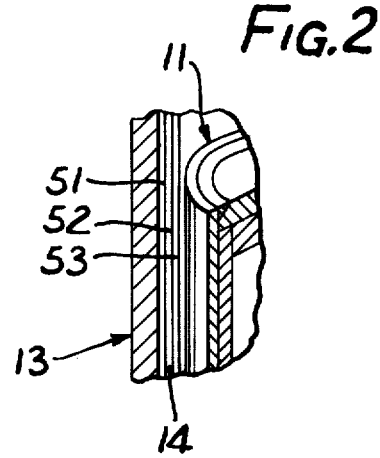

Other objects of the invention will become apparent to those skilled in the art from the following description, taken in connection with the accompanying drawings wherein:

FIG. 1 is a perspective sectional view of a power generator constructed in accordance with the invention; and FIG. 2 is a partial sectional view illustrating a modification in the generator of FIG. 1.

Very generally, the electric power generator of the invention comprises a heat source 11 and a thermoelectric converter 12. An enclosure 13 encapsulates the heat source and the thermoelectric converter. A transparent thermal insulating medium is provided in the space 14 between the heat source and the enclosure and between the thermoelectric converter and the enclosure. The facing surfaces of the heat source and the converter, and the enclosure are heat reflective to a substantial degree to inhibit radiation of heat from the internal elements to the enclosure through the medium.

Referring now more particularly to the specific embodiment illustrated, the heat source 11 may include a suitable radioisotopic heat source charge 19 such as plutonium 238 in a primary capsule indicated at 21. The primary capsule 21 is surrounded by a secondary capsule 25.

The thermoelectric converter 12 is in contact with the heat source 11 and is secured thereto by a suitable adhesive bond. The thermoelectric converter may be of any known type such as a series of thermoelements of bismuth telluride N-type and P-type semiconductor material.

In order to produce a thermal gradient across the thermoelectric converter 12, the end thereof opposite the heat source 11 is bonded with a suitable adhesive to a heat sink 31. The heat sink is fitted within an elongated cylinder 33 which is closed at its lower end by a plug 35 of suitable electrical insulating material. Electrical leads 37 and 39 pass from the thermoelectric converter 12 through openings in the plug 35 for external connection. Seals 36 and 38 are provided in the plug in the openings through which the leads pass.

The encapsulating enclosure comprises an elongated cylindrical outer wall 41 which extends the full length of the assembly of the heat source, thermoelectric converter and heat sink. The enclosure is sealed at its lower end to the interior cylinder 33 and is provided with a closure wall 43 at its upper end spaced from the upper end of the heat source 11. A plug 45 is provided centrally of the wall 43 to enable the interior of the enclosure to be evacuated of air and replaced with xenon.

The xenon in the space within the enclosure 13 surrounds the heat source 11 and thermoelectric converter 12 and provides thermal insulation between such elements and the encapsulating enclosure. The pressure of the xenon within the enclosure may be slightly below atmospheric to facilitate testing. This is because leaks will then be evidenced by an increase in the concentration of the air in the enclosure, which is readily detectible. The presence of the xenon not only provides insulation but aids in suppressing the contribution to thermal conductivity of gases which are evolved by the surfaces of the interior elements of the generator. The space within the enclosure 13 between the interior wall thereof and the heat source 11 and thermoelectric converter 12 is sufficiently small as to reduce the effect of convection currents to a negligible level.

In accordance with the invention, the highly heat emissive surfaces of the heat source 11 and the thermoelectric converter 12, and the highly heat absorptive surfaces of the surrounding enclosure 13, are made heat-reflective to a substantial degree to inhibit radiation of heat from the heat source and the thermoelectric converter to the enclosure through the transparent insulating gas. Preferably this is accomplished by coating the surfaces with a reflective material having an emissivity of less than about 0.10. Such surfaces may be produced by a metallized film, metal foil, vacuum deposited coating, or an electrodeposited coating. Materials which have evidenced satisfactory results include gold and aluminum metallized polyimide (Kapton) film, gold and aluminum foils, and vacuum deposited gold. The metal coating on the surface of the thermoelectric converter is preferably extremely thin to minimize conductive thermal shorts across the thermoelectric converter. This thickness is preferably less than about 0.10 microns. Gold-coated and aluminum-coated polyimide film obtainable from National Metallizing Division of Standard Packaging Corporation are highly desirable for this purpose since the metal thickness is only about 0.03 microns and, additionally, the film itself has very low thermal conductivity and excellent thermal stability.

By way of example, an electric power generator of the type described herein but without the reflective surfaces as above described produced a 479 microwatt (e) output. In accordance with the invention, gold metallized polyimide film was provided on the exterior surfaces of the thermoelectric converter 12. Vacuum deposited gold coatings were provided on the exterior surfaces of the heat source 11 and on the interior surfaces of the enclosure 13. Power output was then measured from the identical battery and found to have increased to 688 microwatts (e). This provides an increase in power generation of 43%.

The improvement provided by the present invention can be used to reduce the amount of radioisotope required to produce a given electrical power output, or can provide a greater power output for a given amount of radioisotopic material. Consequently, a reduction in generator cost for a given power output is attainable. Moreover, a lower radiation level for a given power output is also attainable, thus providing physiological advantages when used in a device such as an implantable cardiac pacing device.

Where the volume of the space 14 is sufficiently large that natural convection currents in the transparent insulating gas occurs, such convection current may be readily eliminated while retaining the benefits of the invention. This may be accomplished by segmenting the space 14 through the use of one or more barriers of thin reflective foil. The space should be approximately equally segmented with reflective barriers to achieve maximum benefit. In FIG. 2, three of these barriers are indicated at 51, 52 and 53. These barriers comprise coaxial sleeves positioned on the axis of the housing and suitably supported at each end by means, not shown. The sleeve may comprise metal foil or metallized polyimide film. The metallized polyimide film is preferable to minimize thermal shorting to the support base. Preferably, the thickness of the barriers is of the order of one mil. Multiple barriers may also be used to further reduce radiation losses where the volume of the space 14 is sufficiently small so as to minimize convection, if the number of barriers used (total foil thickness) does not occupy (displace) sufficient gas insulating space so as to nullify the gain in reduced radiation heat transfer. Typically, two or three foil barriers may be used and a single barrier located at the midpoint may be satisfactory.

The use of one or more barriers as described segments the space 14 and prevents natural convection, thus retaining the benefits of the invention for larger power devices of the type where fibrous type insulations are normally used. Whereas the prior art has frequently utilized a gas filled fibrous insulation, the invention is capable of reducing the thermal conductivity between the interior elements and the housing to one-half as compared with the most efficient gas-filled fiber insulations.

For example, experiments with a xenon gas insulation thickness of 0.325 in. surrounding a heat source and thermoelectric converter assembly resulted in effective thermal conductivities (including radiation and convection losses) of 69 and 58 percent of that for a very efficient xenon-filled fibrous insulation (Min-K TE 1400 made by Johns-Manville) for one and two interspersed one-mil aluminum coated polyimide foils, respectively. The conductivity was higher than for Min-K when no intermediate foil was used because of a large convective heat transfer contribution.

It may therefore be seen that the invention provides an improved electric power generator of the type employing a heat source, a thermoelectric converter, and an encapsulating enclosure. The generator of the invention employs a transparent thermal insulating medium between the internal elements and the enclosure but significantly reduces the radiation of heat from the internal elements to the enclosure through the transparent medium.

Various modifications of the invention in addition to those shown and described herein will become apparent to those skilled in the art from the foregoing description and accompanying drawings. Such modifications are intended to fall within the scope of the appended claims.

What is claimed is:

1. An electric power generator comprising a heat source, a thermoelectric converter, an encapsulating enclosure enclosing said heat source and said thermoelectric converter, and a transparent thermal insulating medium between said heat source and said enclosure and between said thermoelectric converter and said enclosure; said heat source, said thermoelectric converter, and said enclosure having facing metallized surfaces which are sufficiently heat reflective to substantially inhibit radiation of heat from said heat source and said thermoelectric converter to said enclosure through said transparent medium, said metallized surface of said thermoelectric converter having a thickness of less than about 0.10 microns.

2. A generator according to claim 1 wherein reflective foils are positioned within said transparent thermal insulating medium spaced sufficiently closely to inhibit radiation and convection of heat from said heat source and said thermoelectric converter to said enclosure through said transparent medium.

3. A generator according to claim 1 wherein the emissivity of said surfaces is less than 0.10.

4. A generator according to claim 1 wherein at least one of said surfaces is comprised of a metallized polyimide film.

5. A generator according to claim 1 wherein a gold metallized film is provided as an exterior surface of said thermoelectric converter and wherein vacuum deposited gold coatings are provided as the external surface of said heat source and as the interior surface of said enclosure.

6. A generator according to claim 1 wherein said insulating medium is xenon gas.

7. A generator according to claim 1 wherein an aluminum metallized film is provided as an exterior surface of said thermoelectric converter and wherein vacuum deposited gold coatings are provided as the external surface of said heat source and as the interior surface of said enclosure.

8. A generator according to claim 1 wherein said insulating medium is krypton gas.

* * * * *